United States Patent
Meys et al.

(10) Patent No.: US 10,161,267 B2
(45) Date of Patent: Dec. 25, 2018

(54) TURBOMACHINE TEST BENCH WITH ACTIVE NOISE CONTROL

(71) Applicant: Safran Aero Boosters SA, Herstal (Milmort) (BE)

(72) Inventors: Benoit Meys, Boncelles (BE); Alain Lacroix, Anthisnes (BE)

(73) Assignee: Safran Aero Boosters SA (BE)

( * ) Notice: Subject to any disclaimer, the term of this patent is extended or adjusted under 35 U.S.C. 154(b) by 0 days.

(21) Appl. No.: 15/683,881

(22) Filed: Aug. 23, 2017

(65) Prior Publication Data

US 2018/0066545 A1 Mar. 8, 2018

(30) Foreign Application Priority Data

Sep. 5, 2016 (BE) .................................. 2016/5678

(51) Int. Cl.
| | |
|---|---|
| B64C 1/40 | (2006.01) |
| B64F 1/26 | (2006.01) |
| F02K 1/44 | (2006.01) |
| F02K 1/82 | (2006.01) |
| B64D 33/02 | (2006.01) |

(Continued)

(52) U.S. Cl.
CPC .............. F01D 25/285 (2013.01); B64C 1/40 (2013.01); B64F 1/26 (2013.01); F01D 21/003 (2013.01); F02C 7/045 (2013.01); F02K 1/44 (2013.01); F02K 1/827 (2013.01); G01M 15/12 (2013.01); G01M 15/14 (2013.01); G10K 11/178 (2013.01); G10K 11/17857 (2018.01); B64D 2033/0206 (2013.01); F05D 2260/12 (2013.01); F05D 2260/962 (2013.01); F05D 2270/333 (2013.01); F05D 2270/81 (2013.01); G10K 2210/121 (2013.01); G10K 2210/1281 (2013.01)

(58) Field of Classification Search
None
See application file for complete search history.

(56) References Cited

U.S. PATENT DOCUMENTS 4,520,320 A * 5/1985 Potzick .................. G01F 1/667
327/237
5,343,713 A 9/1994 Okabe et al.
(Continued)

FOREIGN PATENT DOCUMENTS

WO 9519075 A2 7/1995

OTHER PUBLICATIONS

European Search Report from corresponding Belgium Application No. BE 201605678, dated May 8, 2017.

*Primary Examiner* — Curtis A Kuntz
*Assistant Examiner* — Kenny H Truong
(74) *Attorney, Agent, or Firm* — Sandberg Phoenix & von Gontard P.C.

(57) ABSTRACT

A test bench for turbomachine comprising: an installation zone for turbomachine; an active system for attenuating the noise emissions produced by the turbomachine. The active system includes an attenuation zone with emitters such as loudspeakers; a first microphone placed downstream of the turbomachine; and a second microphone placed downstream of the attenuation zone. The system reduces the turbomachine waves on the basis of the measurements from the first microphone and from the second microphone. The invention also proposes a method for attenuating the noise emissions from the turbomachine tested in the test bench.

11 Claims, 3 Drawing Sheets

(51) Int. Cl.

| | | |
|---|---|---|
| *F01D 21/00* | (2006.01) | |
| *F01D 25/28* | (2006.01) | |
| *F02C 7/045* | (2006.01) | |
| *G01M 15/12* | (2006.01) | |
| *G01M 15/14* | (2006.01) | |
| *G10K 11/178* | (2006.01) | |

(56) References Cited

U.S. PATENT DOCUMENTS

| | | | |
|---|---|---|---|
| 5,515,444 | A | 5/1996 | Burdisso et al. |
| 5,650,599 | A * | 7/1997 | Madden ............... B64F 1/26 |
| | | | 181/218 |
| 5,662,136 | A | 9/1997 | Drzewiecki et al. |
| 6,201,872 | B1 | 3/2001 | Hersch et al. |
| 2005/0084115 | A1 | 4/2005 | Enamito et al. |
| 2009/0074199 | A1 | 3/2009 | Kierstein et al. |
| 2011/0138772 | A1* | 6/2011 | Zitouni ............... F01D 25/30 |
| | | | 60/226.1 |
| 2012/0070020 | A1* | 3/2012 | Kano ............... G10K 11/178 |
| | | | 381/122 |

\* cited by examiner

TURBOMACHINE TEST BENCH WITH ACTIVE NOISE CONTROL

CROSS-REFERENCE TO RELATED APPLICATIONS

This application claims the benefit, under 35 U.S.C. § 119, of BE 2016/5678 filed on Sep. 5, 2016, the disclosure of which is incorporated herein by reference in its entirety.

FIELD

The invention relates to the field of turbomachine test benches. More precisely, the invention relates to a test bench for turbojets equipped with an active system for attenuating the noise emissions inside and outside the test bench. A further object of the invention is a method for attenuating noise emissions from a turbojet test bench.

BACKGROUND

During design, production, or maintenance, an aircraft turbojet is tested in a specific test bench. Such a test bench makes it possible to test the real performance of the turbojet, while taking measurements therein. The flow rates, the temperatures and the pressures can be measured there in particular during real performance test phases. Now, during these real tests, the turbojet emits sound waves that can exceed 140 dB. Conventional passive exhaust silencers are inadequate in the low frequencies where the input impedance of an absorbent coating would be so high as to virtually prevent the acoustic flow through the coating. These sound waves also excite the items of equipment of the test bench into vibration and can damage them.

Furthermore, these waves propagate into the control rooms and outside the test bench, where they harm the environment. The noise level significantly disturbs the occupants of neighbouring or distant homes. The zone affected by the acoustic power of the turbojet is particularly vast, especially in the case of large aircraft turbojets, or even turbojets operating with an afterburner.

While the active cancellation technologies have been developed for different environments, the conventional approach consisting of generating a cancellation wave cannot easily be tailored to the problem of the exhaust from a jet engine or to any other application where the speed of flow in the passage is high enough to interfere with the detection of the approaching sound wave. Moreover, the properties of the exhaust jet are hostile because of their temperature, their turbulence, and the presence of corrosive gasses.

Consequently, a direct detection and control interface for the exhaust conduit is not easy to implement. Furthermore, the previously known active acoustic attenuation systems achieve noise attenuation by introducing, into the channelling, a cancellation sound that is ideally a mirror image of the incoming undesirable noise. This cancels the noise downstream of the noise source and the introduction of a new sound wave that propagates in the upstream direction. However, if the source of the introduced noise does not absorb the upstream noise, since there is no effective dissipating section between the noise source and the transducer, the acoustic energy can form at a high level in the upstream conduit. This results in high acoustic pressure through the active silencer section, but only a much smaller reduction of the noise propagating in the downstream direction.

In the field of active silencers, it is known to place loudspeakers in a chamber accommodating a conduit for collecting the exhaust jet. The loudspeakers surround the conduit, and are actuated to reduce the acoustic pressure there. The acoustic flow thus increases through the porous wall, which in turn increases the dissipation of the acoustic energy in the conduit.

The document WO 95/19075 A2 discloses a turbojet test bench. The test bench has an exhaust with an active silencer acting on the low frequencies. The silencer processes frequencies from 10 to 80 Hz for a turbojet. It includes a passage surrounded by a porous layer, and several annular chambers around the porous layer. Several microphones are connected to a controller that controls loudspeakers placed in the annular chambers. This system effectively makes it possible to reduce the noise level emitted out of the test bench. This device is particularly efficient in the low frequencies. However, its efficiency remains limited.

The patent document U.S. Pat. No. 5,662,136 A discloses another test bench for turbojet.

SUMMARY

The aim of the invention is to resolve at least one of the problems posed by the prior art. More precisely, the aim of the invention is to improve the efficiency of an active system for attenuating the noise emissions in a turbomachine test bench. A further aim of the invention is to increase the durability of a turbomachine test bench. A further aim of the invention is to propose a simple, affordable and reliable solution.

In various embodiments, the present disclosure provides a test bench for turbomachine, the test bench comprising: an installation zone for a turbomachine; an active system for attenuating sound waves emitted by the turbomachine, the active system including a first microphone placed downstream of the installation zone of the turbomachine, and an attenuation zone for attenuating the sound waves of the turbomachine with an emitter for emitting attenuation sound waves; wherein the active system further comprises a second microphone placed downstream of the attenuation zone, the active system being configured to attenuate the sound waves of the turbomachine as a function of measurements from the first microphone and from the second microphone.

According to various embodiments, the test bench comprises a tube downstream of the installation zone for turbomachine, the attenuation zone being arranged along the tube.

According to various embodiments, the first microphone is placed upstream of the tube and upstream of the attenuation zone.

According to various embodiments, the second microphone is placed downstream of the tube.

According to various embodiments, the test bench comprises a structural wall downstream of the tube, the second microphone being closer to the tube than to the structural wall, the structural wall being perpendicular to the main elongation of the test bench.

According to various advantageous embodiments of the invention, the test bench comprises a passage for a flow from the turbomachine, the first microphone and/or the second microphone being placed in the passage.

According to various advantageous embodiments of the invention, the attenuation zone is situated between the first microphone and the second microphone.

According to various advantageous embodiments of the invention, the first microphone is placed downstream of the installation zone for turbomachine.

According to various advantageous embodiments of the invention, the first microphone and the second microphone are axially spaced from each other of a distance longer than or equal to 16 feet. In alternative embodiments, the distance is longer than or equal to 3 feet, 33 feet or 66 feet.

According to various advantageous embodiments of the invention, the turbomachine has an axis of rotation and the installation zone for turbomachine includes a central axis coaxial to the axis of rotation of the turbomachine, at least one or each microphone being placed on the central axis.

According to various advantageous embodiments of the invention, the turbomachine has an axis of rotation and the installation zone for turbomachine includes a central axis coaxial or parallel to the axis of rotation of the turbomachine, at least one or each microphone being offset by less than 3 feet (1 m) relative to the central axis. Alternatively, the microphone is offset by less than 6 feet.

According to various advantageous embodiments of the invention, the first microphone is more distant from the central axis than the second microphone.

According to various advantageous embodiments of the invention, the test bench comprises a straight corridor in which the installation zone for turbomachine and the second microphone are arranged.

In various alternative or complementary embodiments of the invention, a test bench for turbomachine comprises: an installation zone for a turbomachine; an active system for attenuating sound waves emitted by the turbomachine, the active system including a first microphone placed downstream of the installation zone of the turbomachine, and an attenuation zone for attenuating the sound waves of the turbomachine with an emitter for emitting attenuation sound waves; wherein the bench comprises chimneys with passive systems for attenuating a noise propagating out of the test bench.

According to various advantageous embodiments of the invention, the first microphone is placed outside the chimneys.

According to various advantageous embodiments of the invention, the active system further comprises a second microphone placed downstream of the attenuation zone and the second microphone is directly below one of the chimneys. Alternatively, both microphones can be placed outside of the chimneys.

Various other embodiments of the present disclosure provide a method for attenuating the noise emissions from a turbomachine tested in a test bench is described, the test bench comprising: an installation zone for a turbomachine; an active system for attenuating sound waves emitted by the turbomachine, the active system including a first microphone placed downstream of the installation zone of the turbomachine, and an attenuation zone for attenuating the sound waves of the turbomachine with an emitter for emitting attenuation sound waves; wherein the active system further comprises a second microphone placed downstream of the attenuation zone, the active system being configured to attenuate the sound waves of the turbomachine as a function of measurements from the first microphone and from the second microphone, the test bench comprising an item of equipment with a natural frequency, the method comprising the following steps: (a) test of the turbomachine; (b) emission of attenuation sound waves capable of opposing the sound waves emitted by the turbomachine during the step (a) test; wherein during the step (b) emission, the active system emits attenuation waves at the natural frequency of the item of equipment.

According to various advantageous embodiments of the invention, during the step (a) test, the item of equipment vibrates at its natural frequency, and at a harmonic of its specific frequency and during the step (b) emission, the attenuation waves reach the item of equipment in opposition of phase compared with its vibration during the step (a) test.

According to various advantageous embodiments of the invention, the test bench comprises at least one emitter for emitting sound waves, the at least one emitter being placed downstream of the item of equipment.

According to various advantageous embodiments of the invention, during the step (b) emission, the active system is configured to match the attenuation waves to the reverberation in the test bench, at the second microphone.

According to various advantageous embodiments of the invention, the bench is tailored for an aircraft turbojet exerting a thrust greater than or equal to 22,000 lbs (100 kN).

According to various advantageous embodiments of the invention, the test bench is tailored for an aircraft turbojet exerting a thrust greater than or equal to 17,000 lbs (80 kN) or 44,000 lbs (200 kN).

According to various advantageous embodiments of the invention, the turbomachine installation zone is upstream of the attenuation zone.

According to various advantageous embodiments of the invention, the first microphone is distanced from the vertical extension of the chimneys.

According to various advantageous embodiments of the invention, the first microphone and/or the second microphone is/are placed outside the tube.

According to various advantageous embodiments of the invention, the tube is capable of collecting a gaseous flow caused by the turbomachine.

According to various advantageous embodiments of the invention, the test bench and/or the corridor measure more than 33 feet (10 m) in length, for example more than 100 feet (30 m) in length, in various instances more than 260 feet (80 m) in length. The length can be measured in a straight line.

According to various advantageous embodiments of the invention, the turbomachine installation zone has a passage cross section larger than or equal to 43 ft$^2$ (4 m$^2$), or 269 ft$^2$ (25 m$^2$), or 538 ft$^2$ (50 m$^2$), or 1076 ft$^2$ (100 m$^2$).

According to various advantageous embodiments of the invention, the turbomachine installation zone comprises an arm for fastening the turbomachine, in particular to a turbomachine interface, the fastening arm and/or the turbomachine interface being upstream of the first microphone.

According to various advantageous embodiments of the invention, the turbomachine is capable of exerting an axial thrust greater than or equal to 4,400 lbs (20 kN), for example greater than or equal to 18,000 lbs (80 kN), in various instances greater than or equal to 44,000 lbs (200 kN), in various other instances greater than or equal to 110,000 lbs (500 kN). The fastening arm being designed to absorb the corresponding loads.

The first microphone is not an indispensable aspect of the invention. In various embodiments of the invention is turbomachine test bench is provided wherein the test bench comprises: a turbomachine installation zone; an active system for attenuating the noise emissions produced by the turbomachine, the active system including an attenuation zone with an emitter capable of emitting sound waves for attenuating the turbomachine waves; wherein the active system for attenuating the noise furthermore comprises a microphone placed downstream of the sound attenuation zone.

A further object of the invention is an attenuation method for attenuating the noise emissions from a turbomachine tested in a test bench, the test bench comprising an item of equipment with a specific frequency and an active system for attenuating the noise from the turbomachine, the method comprising the following steps: (a) test of the turbomachine; (b) emission of attenuation sound waves capable of opposing the sound waves emitted by the turbomachine during the step (a) test; wherein during the step (b) emission, the active system emits attenuation waves at the frequency specific to the item of equipment; the test bench potentially conforms to the invention.

According to various advantageous embodiments of the invention, during the step (a) test, the item of equipment vibrates at its specific frequency and potentially at a harmonic of its specific frequency; during the step (b) emission, the attenuation waves reach the item of equipment in opposition of phase compared with its vibration during the step (a) test.

According to various advantageous embodiments of the invention, the test bench comprises an emitter capable of emitting sound waves, the emitter being placed downstream of the item of equipment.

According to various advantageous embodiments of the invention, during the step (b) emission, the active system is configured to match the attenuation waves to the reverberation in the test bench, in particular at the second microphone.

According to various advantageous embodiments of the invention, during the step (a) test, the turbomachine produces a noise louder than 100 dB, or 110 dB, or 120 dB, or 130 dB, or 140 dB, or 150 dB.

According to various advantageous embodiments of the invention, during the step (a) test, the turbomachine causes an airflow moving at least at 112 mph (50 m/s), or 224 mph (100 m/s), or 448 mph (200 m/s), or 672 mph (300 m/s), or 895 mph (400 m/s), the speed being measured in the turbomachine and/or in the turbomachine installation zone, and/or in the tube, and/or in the attenuation zone, and/or at one or each of the microphones.

The advantageous embodiments of each object of the invention are also generally applicable to the other objects of the invention. As far as possible, each object of the invention can be combined with the other objects.

The invention enables improved attenuation of the waves propagating outside the bench. It processes them close to the source. The use of a downstream microphone makes it possible to control the effect of the correction made, in particular in real time. Consequently, the correction is no longer just theoretical, it is tailored to the effect it produces in situ.

As a result of the additional measurement provided by the downstream microphone, the active system can optimize the correction emitted by the loudspeakers. This way, the frequencies that are not sufficiently attenuated at the downstream microphone can be processed by waves in opposition of phase of a greater amplitude.

The invention makes it possible to simplify the passive attenuation systems. The number of rows of acoustic baffles can be reduced. Consequently, the outlet chimney can be shortened. The cost of the test bench therefore reduces in two ways.

DRAWINGS

DETAILED DESCRIPTION

In the description that will follow, the terms inner and outer refer to a positioning relative to the axis of rotation of a turbomachine. The axial direction corresponds to the direction along the axis of rotation of the turbomachine. The radial direction is perpendicular to the axis of rotation. The upstream and the downstream are with reference to the main direction of the flow in the turbomachine.

Figure 1:
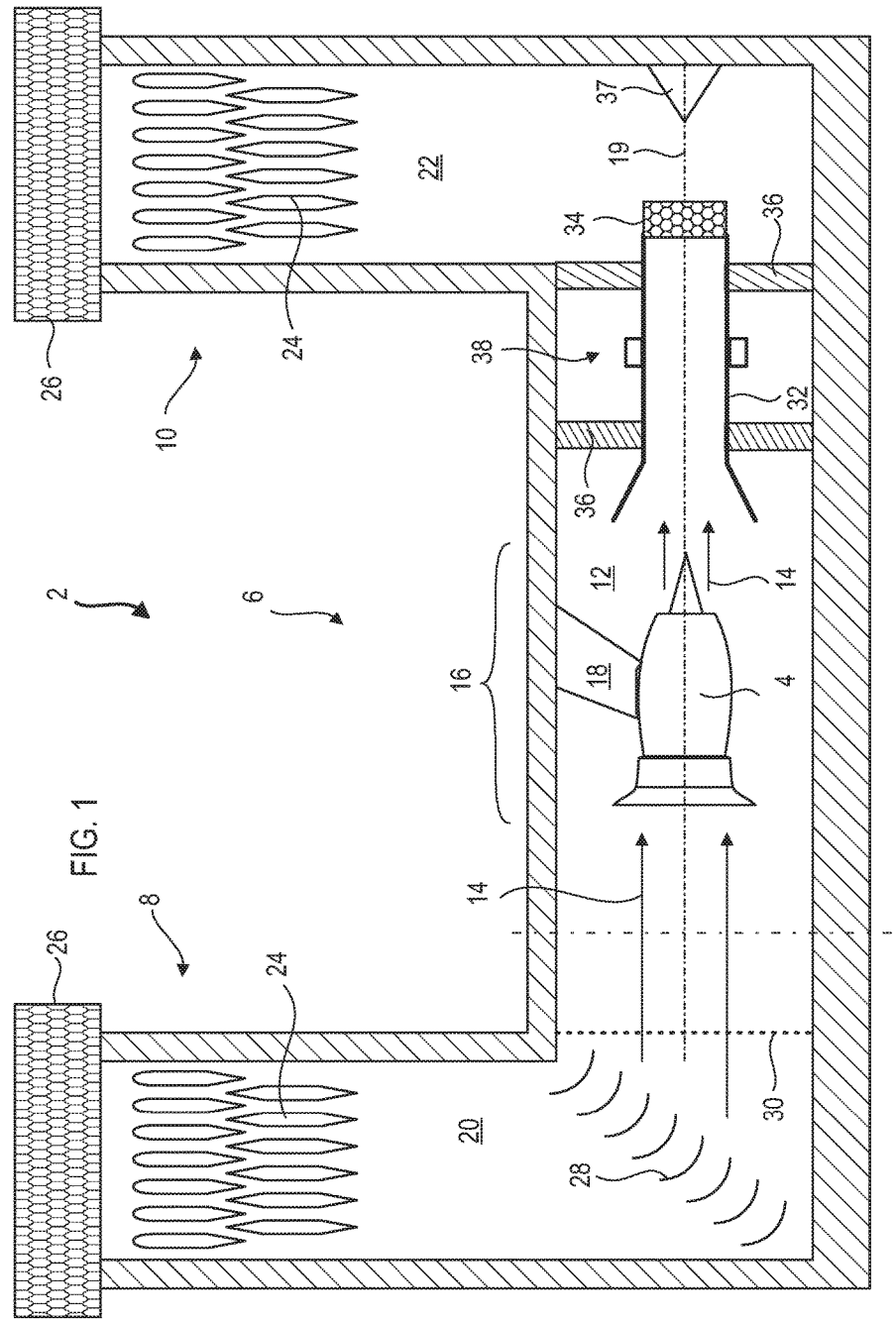
FIG. 1 shows a turbomachine test bench according to various embodiments of the invention.

FIG. 1 shows, in a simplified manner, a test bench 2 for an engine 4, more particularly a test bench 2 for a turbomachine 4, in particular for an aircraft turbojet 4. The test bench 2 can, in various instances, accommodate a complete aircraft, or at least a part of an aircraft.

The test bench 2 forms an infrastructure, a construction. It comprises a passage 6 with an entrance 8 and an exit 10. The passage 6 can comprise a corridor 12, essentially elongated. Its length can be greater than or equal to 200 feet (60 m). The length of the corridor 12 enables an airflow 14 to circulate in a straight line, while limiting the formation of vortices detrimental to the quality of the test.

In order to limit the resistance to the flow through the corridor 12, in particular the resistance opposing the entry of an airflow 14 into the turbomachine 4, the corridor 12 can have a passage cross section larger than or equal to 540 ft$^2$ (50 m$^2$). It should be noted that the airflow 14 passing though the test bench 2 can be caused by the turbomachine 4 itself during its test phase. The passage cross section, or free cross section, can be measured upstream of the installation zone 16 of the turbomachine 4. The passage cross section can be preserved over at least a quarter of the length of the corridor 12, in various instances over the majority.

The installation zone 16 can be a fastening zone for the turbomachine 4. It can be equipped with a fastening arm 18 to which the turbomachine 4 is fastened during its test. The arm 18 can extend vertically from the ceiling of the corridor 12, in the manner of a column or a post. The arm 18 allows the turbomachine 4 to be mounted with an offset, and to center the latter relative to the middle of the corridor 12, relative in particular to a central axis 19 of the corridor 12. The centring is vertical and horizontal.

The corridor 12 can be delimited by vertical chimneys (20; 22), as entrance 8 and exit 10. They allow an admission of air and an emission, both vertical, and elevated relative to the corridor 12. In order to reduce noise nuisance, they can include acoustic baffles 24, or acoustic plates 24, allowing the sound waves to be passively absorbed.

Complementary devices 26 can be present as entrance 8 and exit 10 in order to avoid reversals of flow that would disturb the test conditions. The U-shape arrangement is not indispensable; other configurations, for example without chimneys, can be envisaged. One single chamber can form the passage. The test can be made in open air.

At the junction between the upstream chimney and the corridor 12, the bench 2 is equipped with a row of deflector plates 28. They allow the air descending from the inlet chimney 20 to be reflected in a horizontal direction. They extend horizontally, and cross the entire corridor 12. They have curved profiles. At the entrance to the corridor 12, the bench 2, in various instances, has a grid 30 making it possible to intercept debris likely to disturb the test and to damage the turbomachine 4.

Downstream of the turbomachine 4, the bench 2 includes a tube 32 for collecting the airflow 14 propelled by the turbomachine 4, including its exhaust gasses. The mouth of the tube can form a funnel, an upstream cone converging in a downstream direction. The collector tube 32 assists with absorbing the noise generated during the test. The collector tube 32 is placed horizontally and, in various instances, comprises a diffuser 34 at its outlet. It can form a tube with a perforated wall. This diffuser 34 is also known by the term "blast basket". The diffuser 34 can be in the outlet chimney 22.

The collector tube 32 can be held in the bench 2 by means of at least one bulkhead 36, in various instances, by two bulkheads 36. These bulkheads 36 extend vertically and transversely in the corridor 12. One of them can form a separation between the corridor 12 and the outlet chimney 22. They form sealed separations, that make it possible to contain the flow 14 from the turbomachine 4.

In order to divert the flow from the collector tube 32, and from the optional diffuser 34, a cone 37 can be placed in the extension of the collector tube 32. It can be fastened to a vertical wall at the end of the corridor 12. Its point can coincide with the central axis 19.

In order best to process the noise emissions, the test bench 2 is equipped with an active system 38 for attenuating noise emissions. The active system 38 processes the emissions produced by the turbomachine 4, and can also take into account the phenomena of waves reverberating against the walls of the test bench 2. In effect, the walls of the corridor 12 offer large reflective surfaces.

Although the active system 38 is shown in association with the tube 32, it can also be envisaged to embody an active system for attenuating noise emissions without a tube, or distanced from the collector tube 32.

Figure 2:
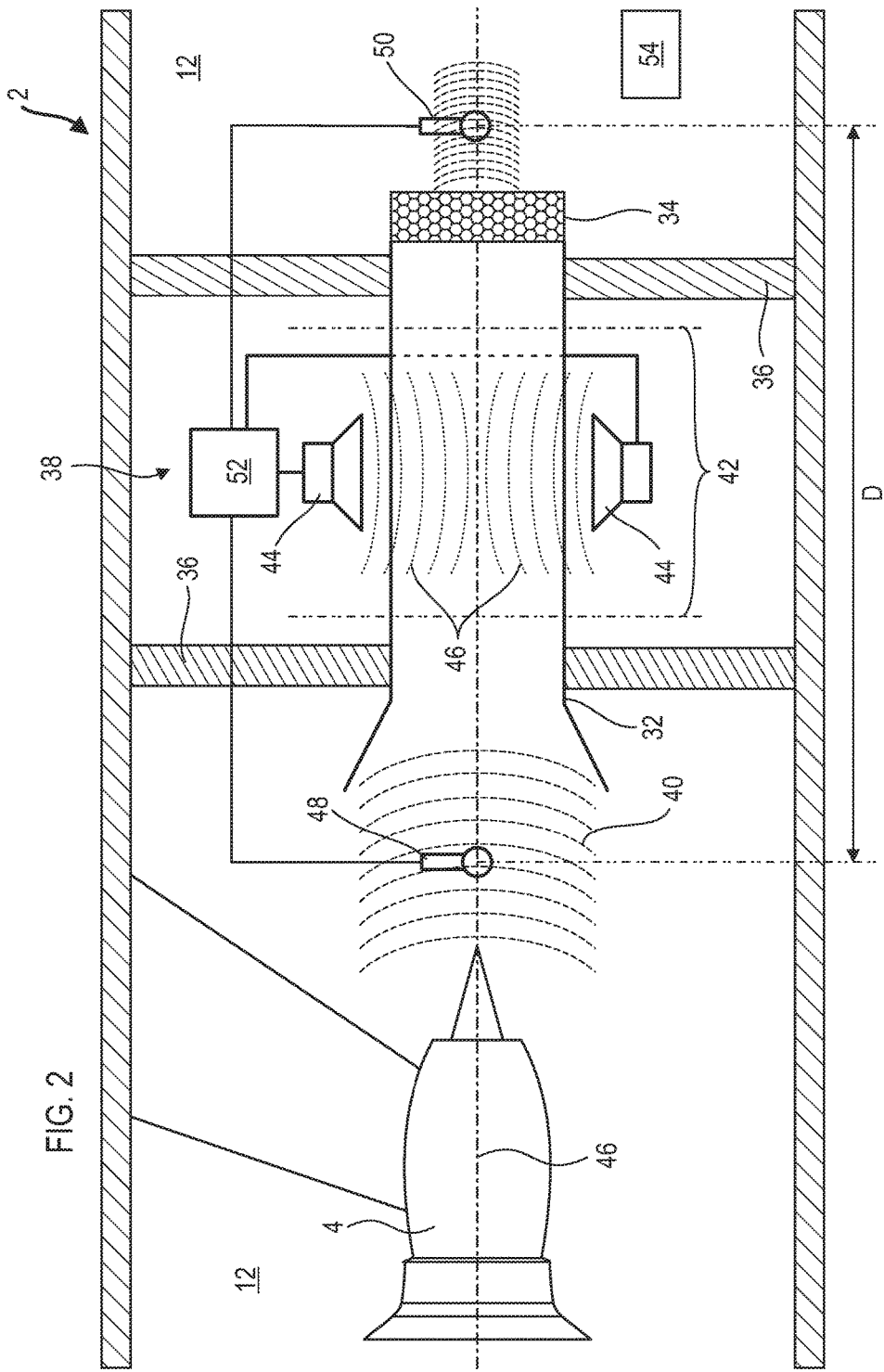
FIG. 2 is a diagram of a portion of the test bench of FIG. 1 according to various embodiments of the invention.

FIG. 2 shows a portion of the test bench 2 of FIG. 1. Appearing there are the turbomachine 4, a section of the corridor 12, the collector tube 32, the diffuser 34 and the active system 38.

When operating, the turbomachine 4 produces sound waves 40, or engine waves. They are pressure waves considered to be harmful, and this in more than one respect. The turbomachine waves 40 can be wide band waves. Such a wide band wave can comprise components having frequencies ranging between 10 Hz and 4000 Hz, or between 80 Hz and 800 Hz. The noise level of these turbomachine waves 40 can exceed 140 dB at the turbomachine 4, which risks disturbing the environment of the test bench 2.

In response, the active system 38 includes an attenuation zone 42 where sound waves 46 are emitted to counter the turbomachine waves 40. This attenuation zone 42 groups together with the emitter 44 capable of emitting sound waves 46, that oppose the passage, the propagation of the turbomachine waves 40. For example, the attenuation sound waves 46 can come in opposition of phase against the turbomachine waves 40 to reduce their amplitudes. The mixture, the sum of their fluctuating pressure fields, tends towards the cancellation.

The emission 44 can comprise noise sources, such as loudspeakers. Even though a single source might be sufficient, several noise sources can be used. The noise sources can be spaced around the tube 32, in one or several circular rows. The emitter 44 can act through the tube 32, or thanks to openings made in the tube 32. The emitter 44 can be directly exposed to the turbomachine waves 40, and hence to the exhaust gasses from the turbomachine 4. The emitter 44 can be placed in the corridor 12. They can be between the bulkheads 36. The latter can form a chamber for protecting the emitter 44, combined with the tube 32.

The active system 38 furthermore includes a first microphone 48, such as an upstream microphone; and a second microphone 50, such as a downstream microphone, that are both connected to a control unit 52. The active system 38 for attenuating noise is configured to reduce the emissions on the basis of the measurements from the first microphone 48 and from the second microphone 50 placed downstream of the former.

Thanks to the measurements from the microphones (48; 50), the control unit 52 defines an electric signal for powering the emitter 44 so that they produce waves 46 for reducing the amplitude of the outgoing noise from the tube 32. The control unit 52 defines an electric correction signal, while taking account of the respective positions of the microphones, the positions of the emitters 44. The speed of the flow caused by the turbomachine 4 can also be considered. Corrections can be made as a function of the physical environment. Consequently, the outgoing noise from the chimney as outlet is reduced. In addition, the action of the acoustic baffles located there is simplified.

The first microphone 48 is placed facing the turbomachine 4, it makes it possible to measure the sound outgoing from it. It is immersed at the same time in the flow propelled by the turbomachine 4, but also in its sound field. The first microphone 48 is arranged upstream of the attenuation zone 42. It is placed upstream of the tube 32, but it can also be placed inside as an alternative.

The second microphone 50 is placed downstream of the attenuation zone 42, for example outside the tube 32. However, it can be arranged inside as a variant. The second microphone 50 makes it possible to check the effect of the correction. If necessary, the control unit 52 modulates the correction to be made as a function of the measurements taken by the second microphone 50. The control unit 52 can increase or reduce certain components of the wide band signal it defines.

The test bench 2 includes different items of equipment 54. For example, sensors, supporting structures. During operation, these items of equipment 54 vibrate because of the oscillating nature of the acoustic pressure existing in the test bench 2. These vibrations can reduce the durability of the item of equipment, and potentially destroy it. This phenomenon can be observed when the turbomachine waves 40 are at the frequency specific to the item of equipment 54 and at a harmonic. In order to counter this phenomenon, the attenuation waves 46 can be tailored to correct this phenomenon. The collector tube 32 can perform as the item of equipment.

Figure 3:
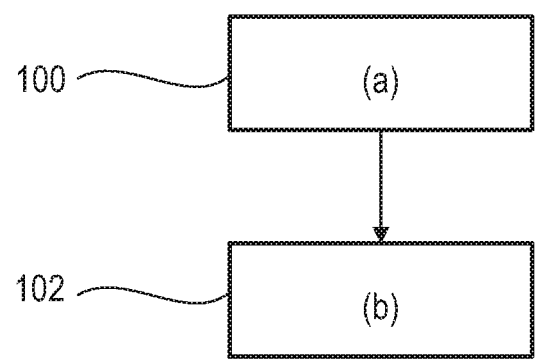
FIG. 3 illustrates a flow chart of the method for attenuating noise emissions according to various embodiments of the invention.

FIG. 3 shows a flow chart of the method for attenuating, or method of controlling, the noise emitted in the direction of the environment from a test bench in which a turbomachine is tested. The test bench can correspond to that described with reference to FIGS. 1 and 2.

In various embodiments, the method can comprise the following steps:

(a) test 100 of the turbomachine; and (b) emission 102 of attenuation sound waves tailored to oppose the sound waves emitted by the turbomachine during the step (a) test 100.

During the step (a) test 100, the item of equipment is excited into vibration because of the noise emissions produced by the turbomachine. The item of equipment can vibrate at its specific frequency. It can also vibrate at one or several harmonics of its specific frequency. The vibration performance of the item of equipment can include several accumulating frequencies, including its specific frequency and one or several harmonics.

During the step (b) emission, the active attenuation system emits in response sound waves at the specific frequency of the item of equipment. During the step (b) emission, the attenuation waves reach the item of equipment in opposition of phase compared with its vibration during the step (a) test 100. Advantageously, the attenuation sound waves comprise a complex signal with several accumulating frequencies. The different frequencies can have different amplitudes. The definition of attenuation sound waves can be based on the measurements from the first microphone and from the second microphone. The complex signal can be tailored to the reverberations. A learning phase or a calibration phase can make it possible to refine the noise attenuation that the active system provides.

What is claimed is:

1. A test bench for an aircraft turbojet, said test bench comprising:
an installation zone for an aircraft turbojet; and
an active system for attenuating sound waves emitted by the aircraft turbojet, the active system including a first microphone placed downstream of the installation zone of the aircraft turbojet, and an attenuation zone for attenuating the sound waves of the aircraft turbojet with an emitter for emitting attenuation sound waves; wherein
the active system further comprises a second microphone placed downstream of the attenuation zone, and
the active system being configured to attenuate the sound waves of the aircraft turbojet as a function of measurements from the first microphone and from the second microphone,
wherein the attenuation zone is situated between the first microphone and the second microphone,
the bench further comprising a tube for collecting the airflow propelled by the aircraft turbojet downstream of the installation zone for the aircraft turbojet, the attenuation zone being arranged along the tube,
the bench further comprising two bulkheads defining a chamber for the emitter, the first microphone and the second microphone being outside of the chamber.

2. The test bench according to claim 1, wherein the first microphone is placed upstream of the tube and upstream of the attenuation zone.

3. The test bench according to claim 1, wherein the second microphone is placed downstream of the tube.

4. The test bench according to claim 1 further comprising a structural wall downstream of the tube, the second microphone being closer to the tube than to the structural wall, the structural wall being perpendicular to the main elongation of the test bench.

5. The test bench according to claim 1 further comprising a passage for a flow from the turbomachine, the first microphone and the second microphone being placed in the passage.

6. The test bench according to claim 1, wherein the first microphone and the second microphone are axially spaced from each other by a distance longer than or equal to 16 feet (5 meters).

7. The test bench according to claim 1, wherein the turbomachine has an axis of rotation and the installation zone for turbomachine includes a central axis coaxial to the axis of rotation of the turbomachine, at least one or each microphone being placed on the central axis.

8. The test bench according to claim 1, wherein the turbomachine has an axis of rotation and the installation zone for turbomachine includes a central axis that is one of coaxial or parallel to the axis of rotation of the turbomachine, at least one or each microphone being offset by less than 3 feet (1 m) relative to the central axis.

9. The test bench according to claim 1 further comprising a straight corridor in which the installation zone for turbomachine and the second microphone are arranged.

10. A test bench for an aircraft turbojet, said test bench comprising:
an installation zone for an aircraft turbojet;
an active system for attenuating sound waves emitted by the aircraft turbojet, the active system including a first microphone placed downstream of the installation zone of the aircraft turbojet, and an attenuation zone for attenuating the sound waves of the aircraft turbojet with an emitter for emitting attenuation sound waves;
a second microphone placed downstream of the attenuation zone;
a tube for collecting the airflow propelled by the aircraft turbojet downstream of the installation zone for the aircraft turbojet, the attenuation zone being arranged along the tube;
two bulkheads defining a chamber for the emitter; and
chimneys with passive systems for attenuating a noise propagating out of the test bench, the second microphone being directly below one of the chimneys outside of the bulkhead.

11. The test bench according to claim 10, wherein the first microphone is placed outside the chimneys.

* * * * *